United States Patent
Mattison et al.

(10) Patent No.: US 11,418,619 B1
(45) Date of Patent: Aug. 16, 2022

(54) SCHEDULING DATA COMMUNICATION FOR DEVICES

(71) Applicant: Amazon Technologies, Inc., Seattle, WA (US)

(72) Inventors: Timothy Mattison, Mount Kisco, NY (US); Chen Yang, Mercer Island, WA (US); Harout Sebouh Hedeshian, Bothell, WA (US); Jimi Shah, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 15/714,748

(22) Filed: Sep. 25, 2017

(51) Int. Cl.
*H04L 67/63* (2022.01)
*H04W 72/12* (2009.01)
*H04W 52/02* (2009.01)

(52) U.S. Cl.
CPC ....... *H04L 67/327* (2013.01); *H04W 52/0216* (2013.01); *H04W 72/1247* (2013.01)

(58) Field of Classification Search
CPC ............ H04L 67/327; H04W 52/0216; H04W 72/1247
USPC ........................................................ 709/223
See application file for complete search history.

(56) References Cited

U.S. PATENT DOCUMENTS

| | | | | |
|---|---|---|---|---|
| 9,648,547 B1 * | 5/2017 | Hart | ......................... | H04L 41/12 |
| 9,667,332 B1 * | 5/2017 | Liao | ...................... | H04B 7/0632 |
| 2007/0077960 A1 * | 4/2007 | Jain | ................... | H04W 52/0254 455/550.1 |
| 2009/0124301 A1 * | 5/2009 | Raissinia | .......... | H04W 52/0216 455/574 |
| 2012/0088460 A1 * | 4/2012 | Nakajima | ......... | H04W 52/0219 455/73 |
| 2015/0103756 A1 * | 4/2015 | Sinha | ..................... | H04W 16/28 342/372 |
| 2015/0326287 A1 * | 11/2015 | Kazmi | ................ | H04W 52/281 375/267 |
| 2016/0020844 A1 * | 1/2016 | Hart | ...................... | H04W 72/04 370/280 |

(Continued)

OTHER PUBLICATIONS

Ingolf Leidert, The ZigBee RF4CE standard, 2009, p. 11 (Year: 2009).*

(Continued)

*Primary Examiner* — Backhean Tiv
(74) *Attorney, Agent, or Firm* — Davis Wright Tremaine LLP

(57) ABSTRACT

Technology is described for configuring data communication schedules for devices. A computing hub in a wireless network may determine a data communication schedule for a device in the wireless network. The data communication schedule may include an assigned time slot for the device to communicate with the computing hub. The data communication schedule with the assigned time slot may be provided from the computing hub to the device. The device may be instructed to wake up from a reduced power mode and enter into an active mode during the assigned time slot defined in the data communication schedule. The computing hub may prioritize data communication for the device during the assigned time slot defined in the data communication schedule and when the device is in the active mode.

20 Claims, 10 Drawing Sheets

(56) References Cited

U.S. PATENT DOCUMENTS

| | | | |
|---|---|---|---|
| 2016/0021011 A1* | 1/2016 | Vasseur | H04W 72/0446 370/235 |
| 2016/0021597 A1* | 1/2016 | Hart | H04W 72/04 370/329 |
| 2016/0029311 A1* | 1/2016 | Wolkowicki | H04W 52/0251 370/311 |
| 2016/0066270 A1* | 3/2016 | Hayes | H04W 52/0216 370/254 |
| 2016/0088571 A1* | 3/2016 | Choi | H04L 5/0048 370/329 |
| 2016/0192364 A1* | 6/2016 | Veyseh | H04W 72/0453 370/329 |
| 2016/0269993 A1* | 9/2016 | Ghosh | H04W 52/0216 |
| 2016/0301604 A1* | 10/2016 | Wang | H04L 45/745 |
| 2016/0302150 A1* | 10/2016 | Palenius | H04W 52/0216 |
| 2016/0360536 A1* | 12/2016 | Bae | H04W 28/02 |
| 2017/0222771 A1* | 8/2017 | Chendamarai Kannan | H04W 28/04 |
| 2018/0035385 A1* | 2/2018 | Lee | H04W 52/367 |
| 2018/0062684 A1* | 3/2018 | Kim | H04B 1/3838 |
| 2018/0103430 A1* | 4/2018 | He | H04W 48/16 |
| 2018/0117446 A1* | 5/2018 | Tran | A42B 3/30 |
| 2018/0167130 A1* | 6/2018 | Vannucci | H04B 7/0617 |
| 2018/0184431 A1* | 6/2018 | Li | H04W 72/042 |
| 2018/0220372 A1* | 8/2018 | Homchaudhuri | H04W 52/0225 |
| 2018/0287828 A1* | 10/2018 | Tavares | H04L 25/0328 |
| 2018/0295583 A1* | 10/2018 | Cornwall | H04W 52/0216 |
| 2018/0309538 A1* | 10/2018 | Verma | H04L 1/0002 |
| 2018/0309552 A1* | 10/2018 | Akkarakaran | H04L 27/2613 |
| 2018/0368017 A1* | 12/2018 | Sundararajan | H04W 72/085 |
| 2019/0007123 A1* | 1/2019 | Rune | H04W 36/0094 |
| 2019/0014589 A1* | 1/2019 | Yerramalli | H04W 52/365 |
| 2019/0059050 A1* | 2/2019 | Fuleshwar Prasad | H04W 52/0206 |
| 2019/0069241 A1* | 2/2019 | Gilson | H04W 52/0241 |
| 2019/0364492 A1* | 11/2019 | Azizi | H04W 68/005 |
| 2020/0229096 A1* | 7/2020 | Atefi | H04W 28/02 |

OTHER PUBLICATIONS

MathIsFun, Amplitude Period Frequency and Phase Shift, Mar. 20, 2015, p. 4, Retrieved via URL: https://www.mathsisfun.com/algebra/amplitude-period-frequency-phase-shift.html (Year: 2015).*

* cited by examiner

SCHEDULING DATA COMMUNICATION FOR DEVICES

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed even relatively simple electronic devices to communicate with other devices and computing systems over a computer network. For example, the Internet of Things (IoT) is the interconnection of computing devices scattered across the globe using the existing Internet infrastructure. Such devices may be able to capture data, and then the devices may securely communicate the data over a network to a centralized computing service in a service provider environment. In one example, the devices may send the data to a computing hub or computing node in a local wireless network, and the computing hub may forward the data received from the devices to the centralized service in the service provider environment.

Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

DETAILED DESCRIPTION

Figure 1:
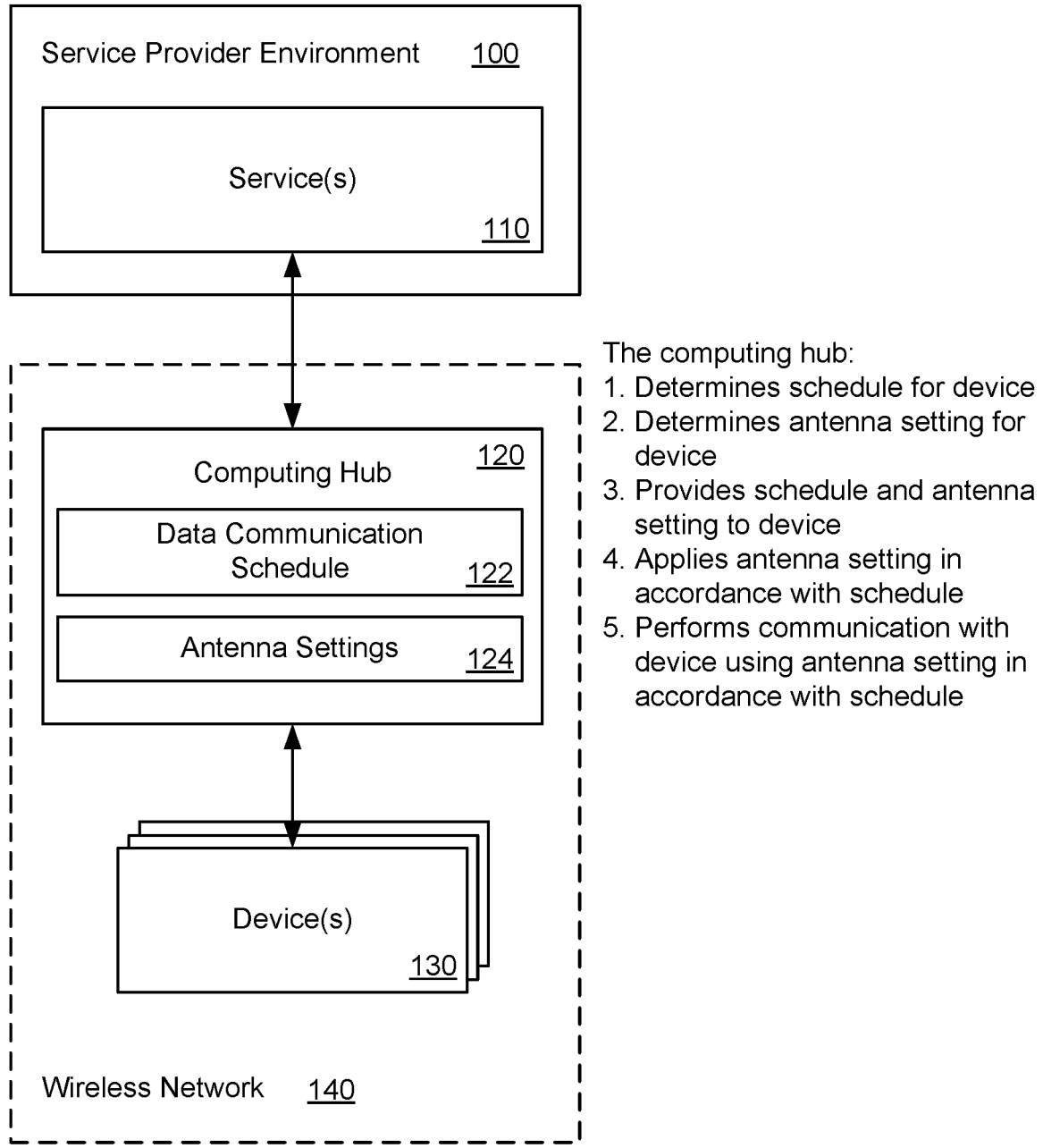
FIG. 1 illustrates a system and related operations for configuring data communication schedules for devices in a wireless network according to an example of the present technology.

A technology is described for configuring data communication schedules for devices. For example, the devices may be IoT devices or embedded devices that have wireless communication capabilities. A computing hub and the devices may form a part of a wireless network, such as a wireless local area network (WLAN), Bluetooth network or ZigBee network. The computing hub may determine a data communication schedule for a device or devices in the wireless network. The data communication schedule may define one or more assigned time slots for the device to communicate with the computing hub (e.g. during which the device may wake up from a reduced power mode in order to communicate with the computing hub). As an example, the computing hub may determine the data communication schedule for the device based on information received from the device, such as a data frequency indicator representing a frequency of data communications with the device and an average size of data communications with the device. As another example, the computing hub may monitor data communications with the device for a defined period of time (e.g., one day or one week), and then determine the data communication schedule based on a frequency of data communications with the device during the defined period of time. After the computing hub has determined the data communication schedule, the computing hub can inform the device of the data communication schedule. The device may communicate data to the computing hub during the assigned time slots defined in the data communication schedule, and the computing hub may process the data and/or forward the data to a computing service in a service provider environment (e.g., for data analysis) or to other destinations accessible via the internet.

In one example, the computing hub may determine a reduced power antenna setting for the computing hub and a corresponding reduced power antenna setting for the device which reduces a level of power consumption for the device when communicating with the computing hub. For example, the computing hub may send one or more training messages to the device. Each training message may be communicated with a separate and varying antenna setting (e.g., antennas used, beam steering, power levels, etc.) being utilized at the computing hub and the device. The device may measure a signal to noise ratio (SNR), power level, or other antenna metrics for each training message received from the computing hub. The device may report the SNR, power level, or other antenna metrics for each training message to the computing hub. The computing hub may select a reduced power antenna setting from separate antenna settings being tested at the computing hub and the device. For example, the reduced power antenna setting that is selected for the device may be associated with a training message that is successfully received at the device with a lower SNR or a lower power level as compared to other training messages.

In one example, the computing hub may provide the data communication schedule (with the assigned time slot or slots) and the reduced power antenna setting to the device. The device may be instructed to be in a reduced power mode (e.g., a sleep mode) as a default mode when not communicating with the computing hub. Based on the data communication schedule, the device may be instructed to change state from the reduced power mode and enter into an active mode during the assigned time slot to perform data communication with the computing hub. Therefore, during the assigned time slot defined in the data communication schedule, the computing hub and the device may each invoke the reduced power antenna setting to create a useful signal path between the computing hub and the device that reduces power consumption at the device, and the device may enter into the active mode. The computing hub may perform a data communication with the device during the assigned time slot and when the reduced power antenna setting is being utilized at both the computing hub and the device. After the data communication is performed, the device may revert back to reduced power mode until an upcoming data communication is to be performed.

In another example, the computing hub may determine a modified antenna setting for the computing hub and the device. The modified antenna setting may or may not be related to reducing the level of power consumption for the device when communicating with the computing hub. For example, the modified antenna setting may be related to an amount of antenna gain, a radiation pattern, beam width, polarization, impedance, etc. During the assigned time slot defined in the data communication schedule, the device and/or the computing hub may apply the modified antenna setting to perform the data communication.

In one example, the computing hub may determine data communication schedules and reduced power antenna settings for a plurality of devices in the wireless network. The computing hub may configure the data communication schedules such that the data communication schedules include a reduced amount of overlapping time slots for the devices, thereby reducing a network congestion level between the devices when performing data communications with the computing hub. In other words, the data communication schedule may be set so that a particular device may be less likely to communicate in a time slot that overlaps with a time slot in which another device communicates with the computing hub, thereby leading to a reduced likelihood of network congestion caused by multiple devices communicating in a same time slot with the computing hub. In addition, the computing hub may configure the reduced power antenna setting for each of the devices in the wireless network, such that the devices utilize a reduced amount of power when transmitting data to the computing hub during the assigned time slots. As a result, the computing hub may improve the device power consumption (e.g., reduced power consumption) and service to each device in the wireless network by using a specific reduced power antenna setting that reduces a level of power consumption for a given device when communicating with the computing hub.

In previous technology, a wireless network would have a plurality of devices that woke up at times of the devices choosing (e.g., intermittently or randomly) and frequently transmitted data at overlapping times or at the same time, thereby causing increased congestion and lowered performance of the wireless network. In previous solutions, the devices were not managed to cause the devices to be scheduled to co-exist and operate efficiently in the wireless network. In contrast, the present technology provides a mechanism to efficiently manage data communication for the plurality of devices in the wireless network. The devices may each be assigned to certain time slots in accordance with data communication schedules, such that there is a decreased likelihood of the devices attempting to communicate with the computing hub at the same time. Moreover, in previous technology, both the computing hub and the device did not modify their respective antenna settings at the same time to improve a signal path for data communication between the computing hub and the device. In contrast, in the present technology, the computing hub and the device may each invoke the respective reduced power antenna setting during the assigned time slot to achieve an improved data communication on a signal path between the computing hub and the device, and the improved data communication may consume a reduced amount of power for the device.

FIG. 1 illustrates an exemplary system and related operations for configuring data communication schedules for devices 130 in a wireless network 140. A computing hub 120 may communicate with the devices 130 (e.g., embedded devices, IoT devices, etc.) within the wireless network 140, and the computing hub 120 may communicate with various service(s) 110 operating in a service provider environment 100, such as a communication scheduling service, a data analysis service, etc. The computing hub 120 may serve as an access point, a wireless gateway, a router, or wireless access point to the internet. The computing hub 120 may be able to securely run local compute functions, messaging, data caching and synchronization capabilities for the devices 130. The computing hub 120 may locally execute program code or program functions on behalf of the devices 130, and the computing hub 120 may be in communication with the service(s) 110 operating in the service provider environment 100, as well as to the devices 130 in the wireless network 140. Therefore, the devices 130 may communicate directly with the computing hub 120 within the wireless network 140, or the devices 130 may communicate with the service(s) 110 operating in the service provider environment 100 via the computing hub 120.

In one configuration, the computing hub 120 may determine a data communication schedule 122 for a device 130 in the wireless network 140. The data communication schedule 122 may include an assigned time slot for the device 130 to communicate with the computing hub 120 within the wireless network 140. Based on the data communication schedule 122, the device 130 may be instructed to be in a reduced power mode as a default mode, and wake up from the reduced power mode and enter into an active mode for the assigned time slot included in the data communication schedule 122.

The computing hub 120 may also determine a reduced power antenna setting 124 for the computing hub 120 and the device 130 which reduces a level of power consumption for the device 130 when communicating with the computing hub 120. The computing hub 120 may provide the data communication schedule 122 and the reduced power antenna setting 124 to the device 130. The computing hub 120 and the device 130 may each apply the reduced power antenna setting 124 during the assigned time slot included in the data communication schedule 122, and the device 130 may enter into the active mode during the assigned time slot. The computing hub 120 may perform data communication with the device 130 during the assigned time slot when the device 130 is in the active mode and when the reduced power antenna setting 124 is being utilized at the computing hub 120 and the device 130.

Figure 2:
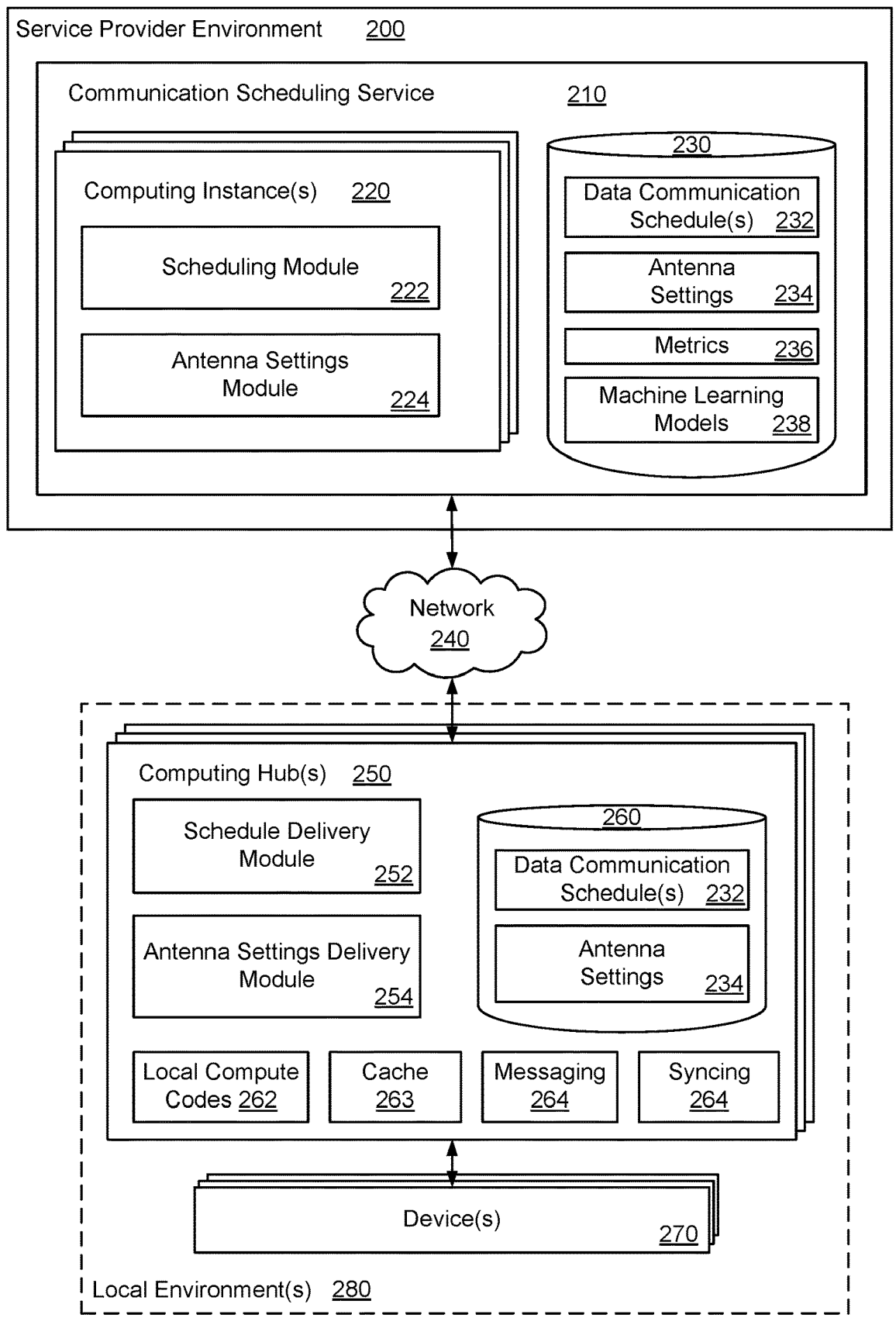
FIG. 2 is an illustration of a networked system for configuring data communication schedules and antenna settings for devices in a wireless network according to an example of the present technology.

FIG. 2 illustrates example components of the present technology in a service provider environment 200. The service provider environment 200 may operate a communication scheduling service 210. The communication scheduling service 210 may utilize one or more computing instances 220 and data store(s) 230 for determining data communication schedules 232 and antenna settings 234 for a plurality of devices 270 (e.g., IoT devices). The communication scheduling service 210 may be in communication with a computing hub 250. The computing hub 250 may also be referred to as a computing node or a communication hub, and the computing hub 250 may serve as an access point, a wireless gateway, a router, or wireless access point to the internet, other networks, and/or the distributed computing power of the service provider environment 200. The communication scheduling service 210 may determine the data communication schedules 232 and the antenna settings 234 for the devices 270 based on information received from the computing hubs 250, and send the data communication schedules 232 and the antenna settings 234 to a respective computing hub 250 for delivery to the devices 270.

In this configuration, multiple computing hubs 250 may be in multiple local environments 280, so it may be advantageous for the communication scheduling service 210 to determine the data communication schedules 232 for the devices 270 since the communication scheduling service 210 may be more effective in configuring non-conflicting data communication schedules 232 for the devices 270 in the multiple local environments 280. After receiving the configuration information, the devices 270 may utilize the data communication schedules 232 and the antenna settings 234 when communicating with the computing hub 250. The computing hub 250 and the devices 270 may be located in a local environment 280, such as a WLAN (wireless local area network), a Wi-Fi network, a personal area network (PAN) or another type of suitable local wireless network.

In one example, the data store 230 may include the data communication schedules 232 for the devices 270. For a given device 270, a data communication schedule 232 may include one or more assigned time slots for the device 270 to communicate with the computing hub 250. The assigned time slots may be represented in a periodic manner, such as every 15 minutes, every hour, every 6 hours, once a day, once a week, etc. Alternatively, the assigned time slots may be fixed specific times during a day or week (e.g., 11 PM on Friday and 3:15 AM on odd days). The assigned time slots may be determined using a round robin mechanism, a cycling mechanism, random scheduling (e.g., randomly finding open slots), or another type of suitable scheduling mechanism. The device 270 may be configured to perform data communications with the computing hub 250 during one of the assigned time slots defined in the data communication schedule 232, and the device 270 may be limited from performing data communications with the computing hub 250 outside one of the assigned time slots unless a special communication is desired or a communication fails.

In one example, the data store 230 may include antenna settings 234 for the devices 270. For a device 270, an antenna setting 234 (or a modified antenna setting or reduced power antenna setting) may be configured to reduce a level of power consumption for the device 270 when communicating with the computing hub 250. For example, if a minimum level of power consumption can be quickly identified, then that minimum power consumption may be selected. However, if a relatively reduced level of antenna settings may be found more quickly without trying every set of antenna permutations, then a configuration for the reduced level of power consumption may be selected. The antenna setting 234 may define a setting that creates a specific signal path for wireless signals between the device 270 and the computing hub 250, such that data transmissions/receptions between the device 270 and the computing hub 250 via the specific signal path utilize a reduced amount of power for the device 270. In one example, the antenna setting 234 may cause an antenna array of the device 270 and/or the computing hub 250 to be steered in a particular direction, thereby causing the specific signal path to be formed between the device 270 and the computing hub 250. Further, the antenna setting 234 may define that certain portions of the antenna array (e.g., a left side, right side, front portion or back portion) at the device 270 and/or the computing hub 250 be active or inactive to reduce the level of power consumption for the device 270 when communicating with the computing hub 250. The antenna setting 234 may define various other types of antenna settings, multiple-input multiple-output (MIMO) antenna settings, power settings, beamforming settings, throughput settings, etc. for both the device 270 and the computing hub 250 that reduces (e.g., minimizes) the power consumption at the device 270 when communicating with the computing hub 250. In addition, the antenna settings 234 may define various types of antenna settings that may or may not be related to power consumption at the device 270, such as an amount of antenna gain, a radiation pattern, beam width, polarization, impedance, etc.

In one example, the data store 230 may include metrics 236. The metrics 236 may include information collected from the devices 270 regarding whether usage of the antenna settings 234 is effective in reducing the power consumption level at the devices 270. For example, each device 270 may report various metrics 236 (e.g., battery levels, current consumed, etc.) when the antenna settings 234 are being utilized at the devices 270. In another example, the metrics 236 may include information collected from the computing hub 250 regarding whether usage of the data communication schedules 232 is effective in reducing a level of network congestion in the local environment 280. For example, the computing hub 250 may report various metrics 236 (e.g., congestion level information for the local environment 280) when the data communication schedules 232 are being utilized at the devices 270. Based on the metrics 236, various modifications may be made to the data communication schedules 232 and/or the antenna settings 234 for the devices 270 to improve power consumption levels and network congestion.

In one example, the data store 230 may include machine learning models 238 or artificial intelligence (AI) models. For example, the machine learning models 238 may be supervised learning techniques such as classification, regression, neural networks, decisions trees and other known machine learning techniques. The machine learning models 238 may be utilized to determine the data communication schedules 232 for the devices 270 or the antenna settings 234 for the devices 270. For example, the machine learning models 238 may be trained based on historical data communication patterns for devices 270 in the local environment 280, which may include an average frequency of data communications for certain types of devices 270, an average size of data communications for certain types of devices 270, etc. Thus, when current data communication patterns, average frequency of data communications, the number of devices and other features are submitted to the machine learning model, then a communication schedule may be determined.

In another example, the machine learning models 238 may be trained based on previously used antenna settings for devices 270 in the local environment 280, which may include previously used antenna settings for other devices 270 at particular locations or orientations/directions within the local environment 280 with respect to the computing hub 250. For example, based on the machine learning models 238, antenna settings 234 may be recommended for a particular device 270 with a known location (e.g., the device is located in a particular quadrant or sector with respect to the computing hub 250) and orientation within the local environment 280. When a new device joins the network, then antenna settings may be applied to the device using the machine learning.

The computing instance(s) 220 operated by the communication scheduling service 210 may utilize a number of modules for determining the data communication schedules 232 or antenna settings 234 for the devices 270. The computing instance(s) 220 may include a scheduling module 222, an antenna settings module 224, and other applications, services, processes, systems, engines, or functionality not discussed in detail.

The scheduling module 222 may be configured to determine the data communication schedules 232 for the devices 270. In one example, the scheduling module 222 may receive a data frequency indicator from the computing hub 250 representing a frequency of data communications between the computing hub 250 and a given device 270, as well as an average size of data communications between the computing hub 250 and the device 270. The scheduling module 222 may determine, using the machine learning models 238, the data communication schedule 232 for the device 270 based on the frequency of data communications, the average size of data communications, a number of devices 270 that are communicating with the computing hub 250, and previously configured data communication schedules 232 for other devices that are communicating with the computing hub 250. The scheduling module 222 may provide the data communication schedule 232 to the computing hub 250. In this configuration, the scheduling module 222 operating as part of the communication scheduling service 210 in the service provider environment 200 may determine the data communication schedules 232 for the devices 270.

The antenna settings module 224 may be configured to determine the antenna settings 234 for the devices 270. In one example, the antenna settings module 224 may receive information on a location of a given device 270 relative to the computing hub 250 or information on a specific device class or device capability associated with the device 270. The antenna settings module 224 may determine, using the machine learning models 238, the antenna settings 234 for the device 270 that may reduce the level of power consumption for the device 270 when communicating with the computing hub 250. In another example, the antenna settings module 224 may receive from the computing hub 250 signal-to-noise ratio (SNR) information and/or power level information for various training signals that were transmitted from the computing hub 250 to the device 270. The antenna settings module 224 may determine, using the machine learning models 238, the antenna setting 234 for the device 270 based on the SNR information and/or power level information received from the computing hub 250. In this configuration, the antenna settings module 224 operating as part of the communication scheduling service 210 in the service provider environment 200 may determine the antenna settings 234 for the devices 270.

In one configuration, the computing hub 250 may include local compute codes 262, which may be instructions for execution at the computing hub 250. The local compute codes 262 may be similar to compute code functions that may be executed in a compute service in the service provider environment 200, but these functions may be available to execute at the device 270 without accessing the service provider environment 200. For example, computing instances may be provided in the computing hub 250, and the local compute codes 262 or compute code functions may execute using a local compute service in the computing hub 250. The local compute codes 262 or compute code functions may be portions of code that may be executed using the local compute service at a request of the devices 270, and return results may be provided to the devices 270. The local compute codes 262 may be functions that launch in a container on a computing instance of the computing hub 250 and are segments of program code that are capable of receiving parameters, performing processing, and returning values. In addition, the local compute codes 262 may be terminated at the computing hub 250 once the local compute codes return values.

In one example, the computing hub 250 may further include a cache 263 for storing device reporting data or state data from the devices 270 while the service provider environment 200 is inaccessible. When the service provider environment 200 becomes accessible again, the device data or state data may be uploaded from the cache 263 to the service provider environment 200. In another example, the computing hub 250 may further include messaging services 264 for providing messaging between the devices 270. In yet another example, the computing hub 250 may further include a syncing service 264 that is used to sync data and device states from the devices 270 to shadow device states in the service provider environment 200. More specifically, the computing hub 250 may cache the state of the devices 270, using a virtual version, or "shadow," of each device 270, which tracks the device's current versus a desired state. These localized shadow states may be synchronized with shadow states in the service provider environment 200.

In one configuration, the computing hub 250 may include a schedule delivery module 252 and an antenna settings delivery module 254. The schedule delivery module 252 may receive the data communication schedules 232 from the scheduling module 222 operating as part of the communication scheduling service 210, and the schedule delivery module 252 may forward the data communication schedules 232 to the devices 270. The antenna settings delivery module 254 may receive the antenna settings 234 from the antenna settings module 224 operating as part of the communication scheduling service 210, and the antenna settings delivery module 254 may forward the antenna settings 234 to the devices 270. In addition, the computing hub 250 may include data store(s) 260 for storing the data communication schedules 232 and the antenna settings 234 received from the communication scheduling service 210.

The devices 270 may be, for example, processor-based systems or embedded systems. The devices 270 may include, but are not limited to, a desktop computer, laptop or notebook computer, tablet computer, handheld computer, workstation, network computer, or other devices with like capability. In another example, the devices 270 may include IoT devices. As non-limiting examples, the devices 270 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 240. Commercial devices may also be included in the definition of the device 270, including: commercial printing presses, commercial freezers, commercial kilns, commercial mixers or other commercial equipment. The devices 270 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The network 240 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
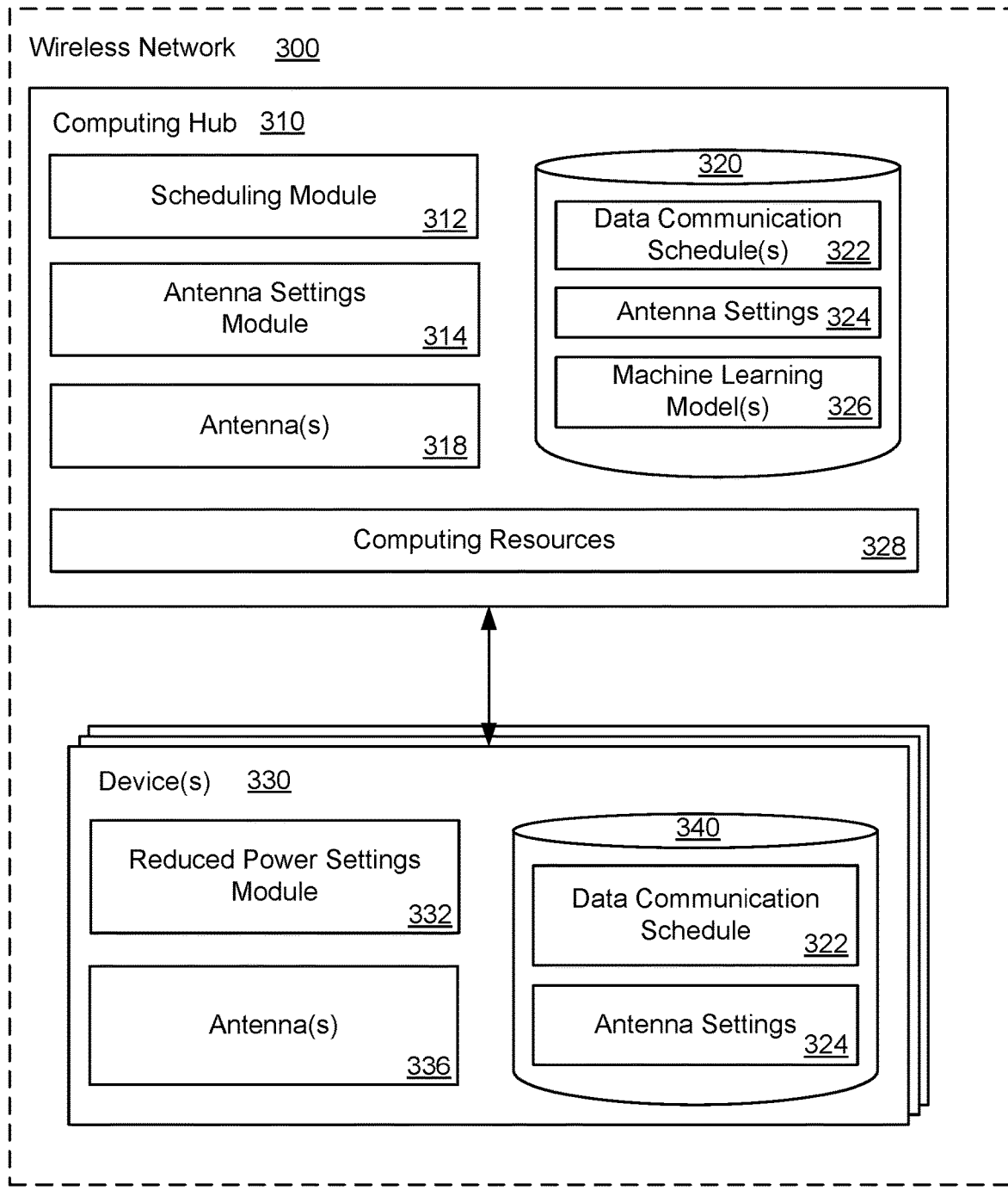
FIG. 3 illustrates a system and related operations for configuring data communication schedules and antenna settings for devices in a wireless network according to an example of the present technology.

FIG. 3 illustrates an exemplary system and related operations for configuring data communication schedules 322 and antenna settings 324 for a plurality of devices 330 in a wireless network 300. The data communication schedules 322 and the antenna settings 324 (or reduced power antenna settings) may be determined, set, or configured at a computing hub 310 in the wireless network 300, and the data communication schedules 322 and the antenna settings 324 may be stored in a data store 320 at the computing hub 310. In one example, the devices 330 may include IoT devices and the wireless network 300 may be a WLAN. The computing hub 310 and the devices 330 may include respective antenna(s) 318, 336, which may enable communication between the computing hub 310 and the devices 330. The antenna(s) 318, 336 may be multiple-input multiple-output (MIMO) antenna arrays (e.g., 4×4 antenna arrays), omnidirectional antenna arrays, directional antenna arrays, etc. In addition, the computing hub 310 and/or the devices 330 may support beamforming and other related wireless communication techniques to improve data communication between the computing hub 310 and the devices 330.

In one configuration, the computing hub 310 may include a scheduling module 312 configured to determine a data communication schedule 322 for devices 330 in the wireless network 300. The data communication schedule 322 may include one or more assigned time slots for the devices 330 to communicate with the computing hub 310. In other words, the devices 330 may be permitted to communicate with the computing hub 310 during the assigned time slots defined in the data communication schedule 322, and the devices 330 may be restricted from communicating with the computing hub 310 outside the assigned time slots. The scheduling module 312 may define a data communication schedule 322 with assigned time slots of varying frequency and/or times depending on a time of day or an expected load in the wireless network 300. In addition, the scheduling module 312 may dynamically change the data communication schedule 322 based on updated parameters and settings of the devices 330, or network conditions.

In one example, the scheduling module 312 may receive a data frequency indicator from the device 330 that represents a frequency of data communications between the computing hub 310 and the device 330. The scheduling module 312 may receive an average size indicator from the device 330 that represents an average data transfer size of data communications between the computing hub 310 and the device 330. The scheduling module 312 may use a machine learning model 326 to determine the data communication schedule 322 for the device 330 based on the frequency of data communications and the average size of data communications. In another example, the scheduling module 312 may monitor data communications with the device 330 for a defined period of time, and the scheduling module 312 may use the machine learning model 326 to determine the data communication schedule 322 based on a frequency of data communications between the computing hub 310 and the device 330 during the defined period of time. In yet another example, the scheduling module 312 may use the machine learning model 326 and a historical data communication pattern of the device 330 to determine the data communication schedule 322 for the device 330. In a further example, the scheduling module 312 may determine the data communication schedule 322 for the device 330 based on input received from an operator of the device 330 (e.g., via a user interface). In other words, the operator of the device 330 may define the data communication schedule 322 for the device 330 via the user interface.

In one configuration, the computing hub 310 may include an antenna settings module 314 configured to determine an antenna setting 324 for the device 330 in the wireless network 300. For example, the antenna settings module 314 may determine the antenna setting 324 for the computing hub 310 and the device 330 that reduces (e.g., minimizes) a level of power consumption for the device 330 when communicating with the computing hub 310. The antenna settings 324 may enable the antenna(s) 318 of the computing hub 310 to be directed towards the antenna(s) 336 of the device 330, such that a useful signal path is formed between the computing hub 310 and the device 330 to achieve a reduced level of power consumption at the device 330. In one example, the antenna settings module 314 may determine a particular location of the device 330 within the wireless network 300 and/or a specific orientation of the device 330 within the wireless network 300, and the antenna settings module 314 may use the machine learning model 326 with the collected locations and orientations to determine the antenna setting 324 for the device 330 based on previously used antenna settings for other devices 330 (with certain locations and orientations) in the wireless network 300. In another example, the antenna settings module 314 may determine the antenna setting 324 based on one or more training messages or training signals that are sent to the device 330. The antenna setting module 314 may use these training messages or training signals to find efficient or improved antenna settings.

In one example, the scheduling module 312 and the antenna settings module 314 may provide the data communication schedule 322 and/or the antenna setting 324, respectively, to the device 330. The data communication schedule 322 and the antenna setting 324 may be stored in a data store 340 of the device 330. Based on the data communication schedule 322, the device 330 may be configured or instructed to wake up from a reduced power mode and enter into an active mode during the assigned time slot defined in the data communication schedule 322. In the reduced power mode, the device 330 may shut off power to one or more device computing components. For example, in the reduced power mode, the device 330 may shut off a screen, turn off wireless modules, turn off a hard drive, etc. The device 330 may be in the reduced power mode as a default when not communicating with the computing hub 310. In the active mode, the device 330 may turn on power to one or more device computing components. For example, in the active mode, the device 330 may turn on a screen, turn on wireless modules, turn on a hard drive, etc. The device 330 may transition to the active mode to communicate with the computing hub 310, and the device 330 may be unable to communicate with the computing hub 310 in the reduced power mode.

In one example, the computing hub 310 and the device 330 may each invoke the antenna setting 324 during the assigned time slot defined in the data communication schedule 322, and the computing hub 310 and the device 330 may perform data communication during the assigned time slot when the device 330 is in the active mode and the antenna setting 324 is being utilized at both the computing hub 310 and the device 330. Therefore, the device 330 may transmit/receive data to/from the computing hub 310 while in the active mode and during an assigned time slot in accordance with the data communication schedule 322 and/or the antenna setting 324. The data received at the computing hub 310 from the device 330 may be provided to a service operating in a service provider environment (see FIG. 2), or alternatively, data received from the service at the computing hub 310 may be forwarded to the device 330.

In one example, the device 330 may include a reduced power settings module 332 to manage reduced power settings for the device 330. Based on instructions received from the computing hub 310, the reduced power settings module 332 may set the device 330 be in the reduced power mode as a default setting when not communicating with the computing hub 310. The reduced power settings module 332 may instruct the device 330 to wake up from the reduced power mode during the assigned time slot defined in the data communication schedule 322, and the device 330 may transition into the active mode in order to perform the data communication with the computing hub 310 during the assigned time slot. After the data communication is performed, the reduced power settings module 332 may instruct the device 330 to revert back to the reduced power mode until another data communication is to be performed (as indicated in the data communication schedule 322). Therefore, the device 330 may enter the active mode during assigned time slots defined in the data communication schedule 322, and the device 330 may be in the reduced power mode outside of the assigned time slots.

In one configuration, the scheduling module 312 may determine the data communication schedules 322 for the plurality of devices 330 in the wireless network 300, and the data communication schedules 322 may include a reduced level of overlapping time slots for the devices 330 to reduce a congestion level between the devices 330 when performing data communications with the computing hub 310. In other words, the scheduling module 312 may attempt to achieve a balanced communication load in the wireless network 300 by reducing an amount of overlap in device communication between the devices 330. The scheduling module 312 may configure separate devices 330 to utilize separate assigned time slots when communicating with the computing hub 310 to reduce network congestion, or there may be some overlap between assigned time slots for multiple devices 330. For example, multiple devices 330 may be able to communicate with the computing hub 310 in a same time slot, as the computing hub 310 may have multiple antennas 318 to support communication with multiple devices 330 in the same time slot. The scheduling module 312 may spread out the data communication for the devices 330 to improve power usage, improve wireless bandwidth efficiency and reduce spikes in network traffic. Furthermore, although the computing hub 310 may communicate with multiple devices 330 in overlapping time slots, the antenna settings module 314 may ensure that the computing hub 310 communicates with each of the multiple devices 330 using antenna settings 324 that cause a reduced power consumption level at the devices 330, thereby improving battery life or power consumption for the devices 330. In some cases, when multiple devices 330 are scheduled to communicate in overlapping time slots, the antenna settings 324 for each device 330 may define an increased transmission power to ensure that data transmitted from each device 330 is successfully received. The devices 330 may be able to utilize reduced power antenna settings due to the reduced network congestion during the assigned time slots when the devices 330 are awake. As a result, the scheduling module 312 may intelligently manage the data communication for the plurality of devices 330 in the wireless network 300, while reducing an amount of network congestion caused by devices 330 simultaneously attempting to transmit/receive data.

In one configuration, the computing hub 310 may schedule computing resources 328 included in the computing hub 310 to be used by the devices 330. For example, rather than multiple devices 330 sending requests to the computing hub 310 at the same time for using the computing resources 328 (e.g., computing instances, local compute functions, services, data stores, etc.), the computing hub 310 may schedule usage of the computing resources 328 (or processing functions) for individual devices 330. As a result, the computing resources 328 on the computing hub 310 may be less likely to be overwhelmed at a certain time period when an increased number of devices 330 are connected to the computing hub 310. The computing resources 328 on the computing hub 310 may be used for general computing by the devices 330. Since the devices 330 may not have the capability of performing such computations themselves, the devices 330 may send the requests to use the computing resources 328 on the computing hub 310.

In one example configuration, the computing hub 310 may allocate one or more open time slots for the devices 330 in the wireless network 300. The open time slots may not be assigned to any one device 330 in the wireless network 300. Rather, these open time slots may be used by devices 330 that are unable to communicate during their respective assigned time slot. In other words, the device 330 may be permitted to perform data communication with the computing hub 310 in one of the open time slots when the device 330 is unable to perform the data communication during the assigned time slot defined in its data communication schedule 322. For example, the device 330 may have moved to a new location within the wireless network 300, and is therefore unable to communicate with the computing hub 310 during the assigned time slot using its antenna settings 324. In this example, the device 330 may perform the data communication during the open time slot and by using an increased amount of power to perform the data communication, and then the antenna settings 324 for the device 330 may be readjusted based on the new location of the device 330.

In one example, the device 330 may perform data communication with the computing hub 310 during the assigned time slot using a dedicated amount of data bandwidth for the device 330. In this example, a reduced number of devices 330 may be assigned to the same time slot at the same time, so therefore, each device 330 may be allocated with the dedicated amount of data bandwidth. The dedicated amount of data bandwidth may depend on a number of devices 330 that are configured to communicate in one assigned time slot. For example, the dedicated amount of data bandwidth may be increased for a particular device 330 when the number of devices 330 that are configured to communicate in the same assigned time slot is reduced. On the other hand, the dedicated amount of data bandwidth may be decreased for a particular device 330 when the number of devices 330 that are configured to communicate in the same assigned time slot is increased. The devices 330 may utilize the dedicated amount of bandwidth to perform activities that involve increased data throughput, such as downloading firmware updates, downloading new software, etc.

Figure 4:
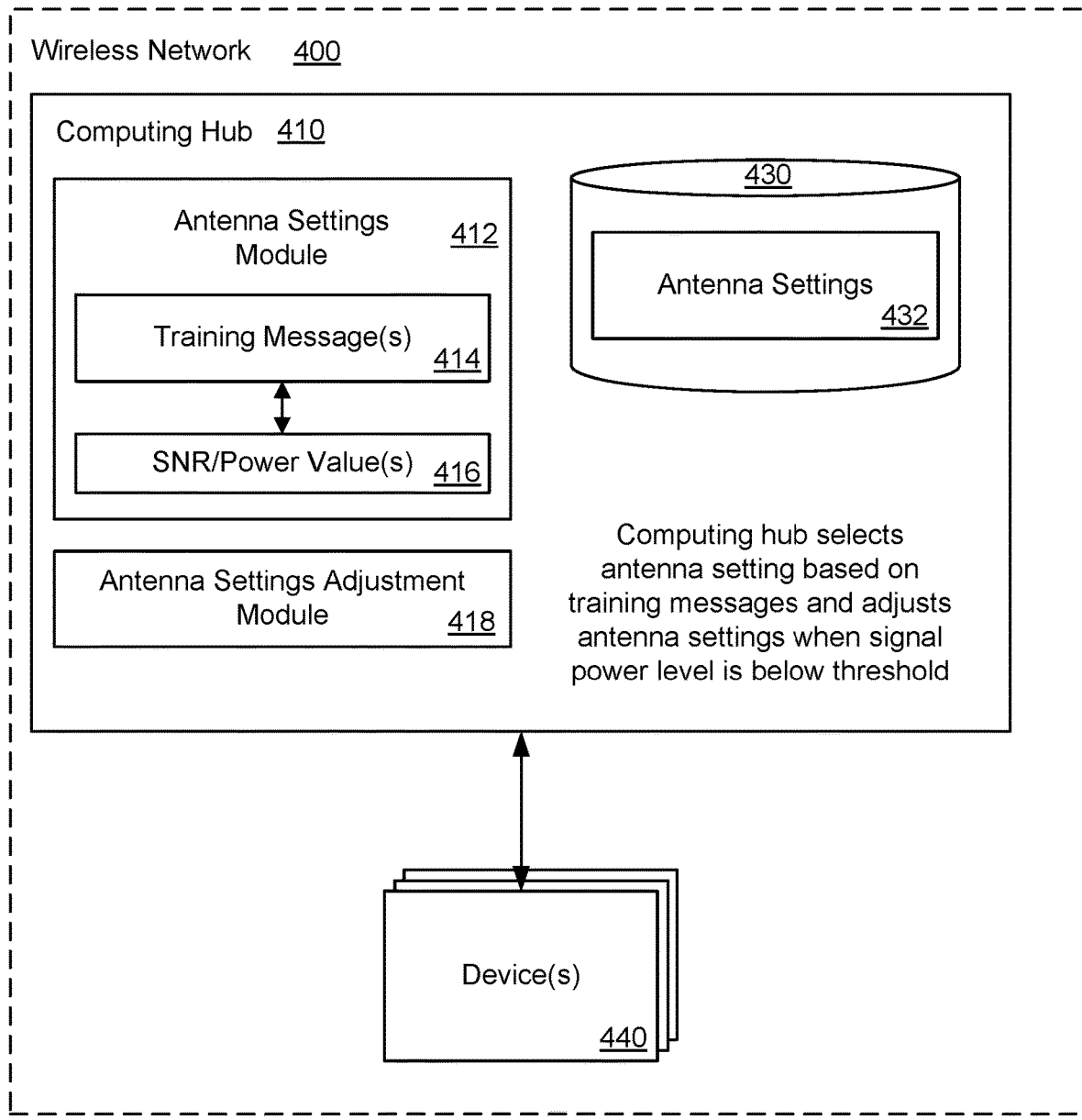
FIG. 4 illustrates a system and related operations for configuring antenna settings for devices in a wireless network according to an example of the present technology.

FIG. 4 illustrates an exemplary system and related operations for configuring antenna settings 432 for devices 440 in a wireless network 400. The antenna settings 432 (or reduced power antenna settings) may be configured at a computing hub 410 in the wireless network 400, and the antenna settings 432 may be stored in a data store 430 at the computing hub 410, as well as on the devices 440. In one example, the computing hub 410 may include an antenna settings module 412 configured to determine the antenna settings 432 for each device 440 in the wireless network 400 and corresponding antenna settings for the computing hub 410 to communicate with each device 440, and the antenna settings 432 may be selected to reduce a level of power consumption at the devices 440. The computing hub 410 may determine the antenna settings 432 on a device-by-device basis, or alternatively, the computing hub may determine antenna settings 432 that are to be globally applied to a set of devices 440 within the wireless network 400.

The antenna settings module 412 may determine the antenna settings 432 for the device 440 after the device 440 initially powers on and connects to the wireless network 400 using a service set identifier (SSID) and device credentials. The antenna settings module 412 may determine that the device 440 has not connected to the wireless network 400 before, so the antenna settings module 412 may initiate a process to improve a device performance by configuring various antenna and power settings for the device 440 and testing which antenna configurations reduce a level of power consumption for the device 440 when communicating with the computing hub 410.

In one example, the antenna settings module 412 may send one or more training messages 414 to the device 440. Each training message 414 may be communicated with a separate antenna setting being utilized at the computing hub 410 and the device 440. The training messages 414 may also have varying power settings and throughput settings. The device 440 may measure a signal to noise ratio (SNR) or power value 416 of each training message 414 received from the computing hub 410. The device 440 may report the SNR/power value 416 for each training message 414 to the computing hub 410. The antenna settings module 412 may select the antenna setting 432 for the computing hub 410 and the device 440 from the separate antenna settings, power settings, throughput settings, etc. being utilized at the computing hub 410 and the device 440 for sending/receiving the training messages 414. More specifically, the antenna settings module 412 may select the antenna setting 432 that is associated with a training message 414 that is successfully received at the device 440 with a reduced SNR or reduced power value as compared to other training messages 414. In one example, the antenna setting 432 may be selected that has the lowest SNR or power value as compared to other training messages 414. In other words, the antenna setting 432 that is selected for the device 440 may enable the device 440 to communicate with the computing hub 410 using a reduced amount of power, thereby saving battery life at the device 440.

In one example, the device 440 may receive a plurality of training messages 414 from the computing hub 410, and the device may measure a signal metric for each training message 414 that is successfully received from the computing hub 410. The signal metric may include an SNR value, a received signal strength indicator (RSSI), etc. The device 440 may report the signal metric for each training message 414 that is successfully received to the computing hub 410, and the antenna setting 432 may be selected based on the signal metric associated with each of the training messages 414.

In one example, the antenna settings module 412 may be unsuccessful in determining the antenna setting 432 for the device 440. For example, the device 440 may be installed at a location within the wireless network 400 that causes a poor radio frequency (RF) signal path between the device 440 and the computing hub 410. In this case, the antenna settings module 412 may recommend an installer of the device 440 change the location of the device 440 within the wireless network 400.

In one example, the computing hub 410 may receive a data communication from the device 440, and the computing hub 410 may detect that a signal power level associated with data received from the device 440 is below a defined threshold. For example, the computing hub 410 may detect that an SNR associated with a received signal is below the defined threshold. In this example, an antenna settings adjustment module 418 in the computing hub 410 may adjust the antenna setting 432 for the device 440 to improve the signal power level for the device 440 to above the defined threshold when communicating with the computing hub 410. For example, in order to adjust the antenna setting 432, the antenna settings adjustment module 418 in the computing hub 410 may repeat a training process by resending one or more training messages 414 to the device 440. Based on SNR/power values 416 associated with each training message 414, the antenna settings adjustment module 418 in the computing hub 410 may reconfigure an appropriate antenna setting 432 for the device 440. In another example, the antenna settings adjustment module 418 in the computing hub 410 may adjust the antenna setting 432 and/or verify that the antenna setting 432 is still appropriate when the device 440 has moved to a new location within the wireless network 400.

In one example, the computing hub 410 may receive a data communication from the device 440, and the computing hub 410 may determine that the data communication is unreadable to the computing hub 410. Therefore, the computing hub 410 may adjust the antenna setting 432 for the device 440 and/or the computing hub 410 to an antenna setting 432 that causes the device 440 to send data that is readable to the computing hub 410. For example, the computing hub 410 may adjust the antenna setting 432 using one or more training messages 414 re-sent to the device 440.

Figure 5:
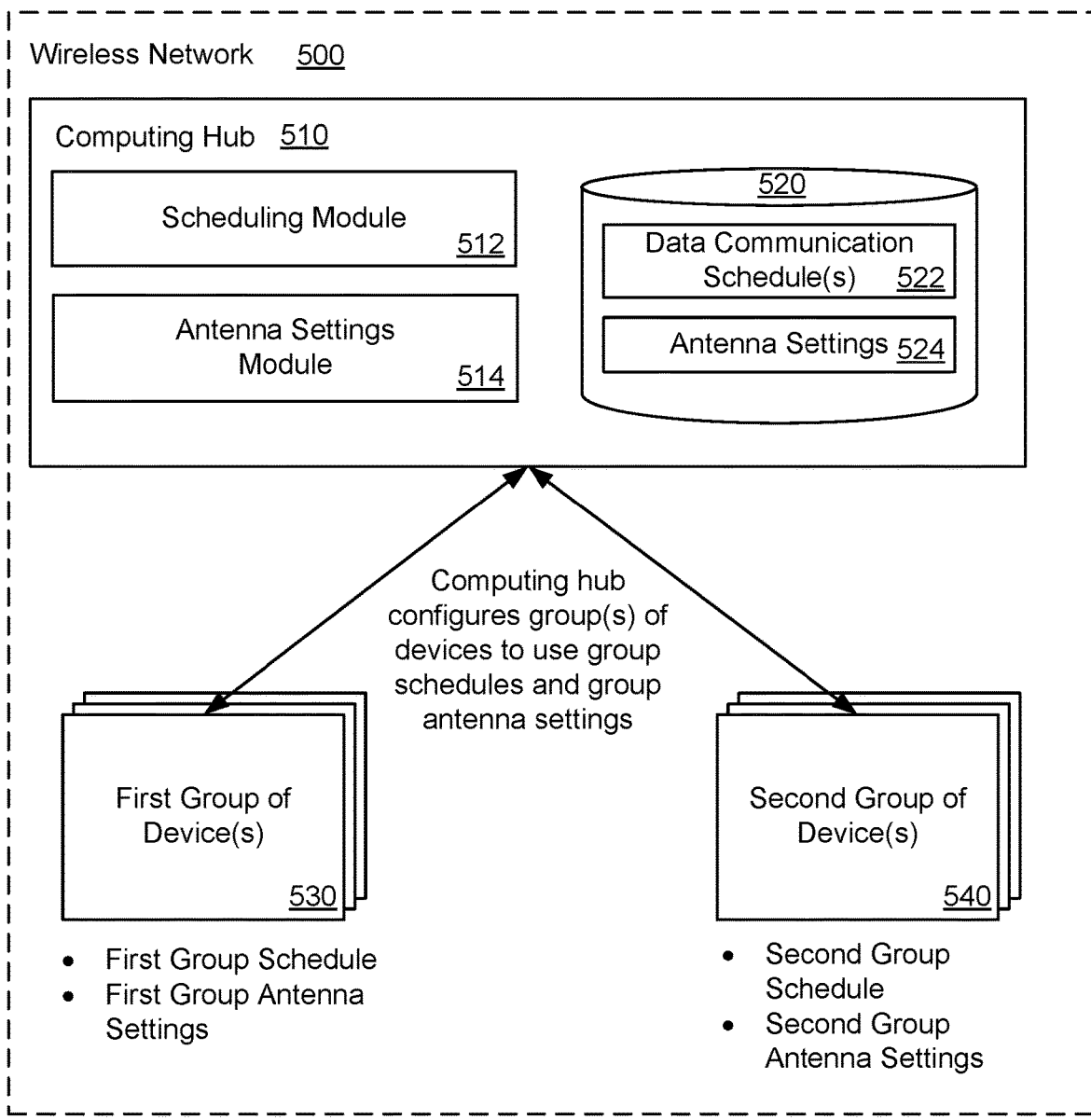
FIG. 5 illustrates a system and related operations for configuring groups of devices to use common data communication schedules and antenna settings in a wireless network according to an example of the present technology.

FIG. 5 illustrates an exemplary system and related operations for configuring groups of devices to use group data communication schedules 522 for the group and group antenna settings 524 in a wireless network 500. A computing hub 510 in the wireless network 500 may configure the data communication schedules 522 and the antenna settings 524 (or reduced power antenna settings) for various groups of devices in the wireless network 500. For example, a scheduling module 512 in the computing hub 510 may configure group data communication schedules 522 with group assigned time slots for a first group of devices 530, and an antenna settings module 514 in the computing hub 510 may configure group antenna settings 524 for the first group of devices 530. In other words, the computing hub 510 may configure the first group of devices 530 to use a first group data communication schedule 522 and second group antenna settings 524, for example, due to a common location for the first group of devices 530 within the wireless network 500, a common device type, a common type of data communication, etc. Alternatively, each individual device in the first group of devices 530 may communicate with the computing hub 510 in a separate time slot, but using the group antenna settings 524. In this alternative, the computing hub 510 may enable each device in the first group of devices 530 to communicate during a separate but adjacent time slot while using the group antenna settings 524, which allows the computing hub 510 to remain tuned to the group antenna settings 524 and avoid collisions between the first group of devices 530 due to the adjacent time slots. Similarly, the scheduling module 512 may configure group data communication schedules 522 with group assigned time slots for a second group of devices 540, and the antenna settings module 514 may configure group antenna settings 524 for second first group of devices 540. In other words, the computing hub 510 may configure the second group of devices 540 to use a second group data communication schedule 522 and second group antenna settings 524. In one example, the computing hub 510 may decide, using a machine learning model, to group together certain devices within the wireless network 500 together based on a location, orientation and/or device type of the devices, and the group data communication schedules 522 and the group antenna settings 524 may be assigned to the grouped devices.

Figure 6:
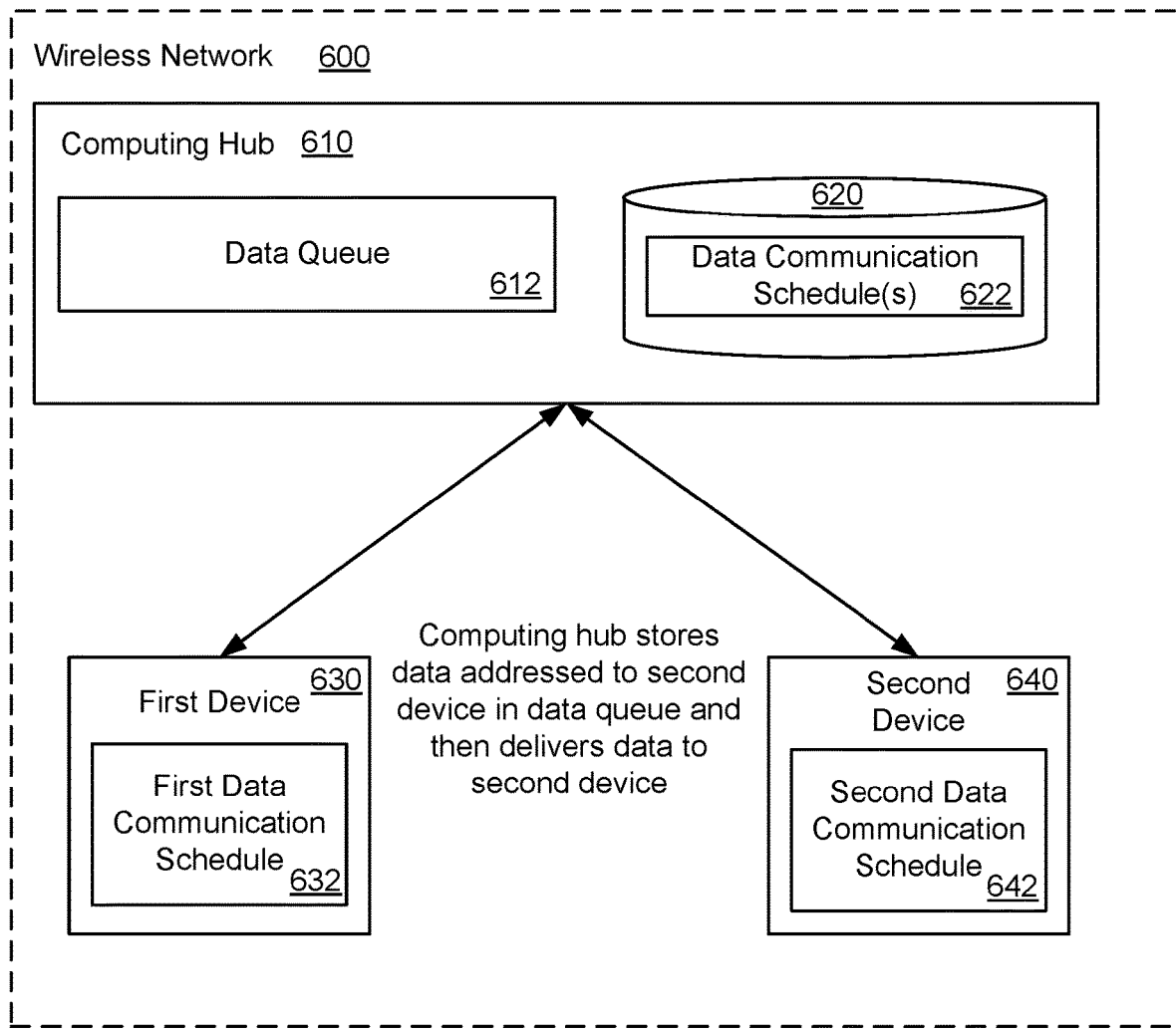
FIG. 6 illustrates a system and related operations for facilitating data communication between devices in a wireless network according to an example of the present technology.

FIG. 6 illustrates an exemplary system and related operations for facilitating data communication between devices in a wireless network 600. A computing hub 610 in the wireless network 600 may configure data communication schedules 622 for the devices in the wireless network 600, and the data communication schedules 622 may be stored in a data store 620 of the computing hub 610. For example, the computing hub 610 may configure a first data communication schedule 632 for a first device 630 and a second communication schedule 642 for a second device. The first data communication schedule 632 and the second data communication schedule 642 may each define assigned time slots during which the first and second devices 630, 640, respectively, are able to communicate with the computing hub 610.

In one example, the first device 630 and the second device 640 may perform data communications with each other via the computing hub 610. For example, the first device 630 can send data to the computing hub 610 during an assigned time slot defined in the first data communication schedule 632, and the data may be addressed to the second device 640. The computing hub 610 may receive the data and store the data in a data queue 612 maintained at the computing hub 610. The computing hub 610 may retrieve the data from the data queue 612 and send the data to the second device 640 during an assigned time slot for the second device 640 in accordance with the second data communication schedule 642. Therefore, the computing hub 610 may receive/forward data between the first device 630 and the second device 640, or vice versa, during assigned time slots defined in the first and second data communication schedules 632, 642, respectively.

In one configuration, the computing hub 610 may be a master aggregator node or gateway that is configured to relay data between devices in the wireless network 600 and a service that operates in a service provider environment. The master aggregator node may relay data to the service provider environment in accordance with a master node aggregator schedule. In some cases, the computing hub 610 may go offline or become unavailable, and another device in the local network of devices may be elected as a new master aggregator node. For example, the first device 630 or the second device 640 in the wireless network 600 may be elected as the new master aggregator node. After the first device 630 or the second device 640 is elected as the new master aggregator node, the first device 630 or the second device 640 may follow the master node aggregator schedule that was previously used by the previous master aggregator node. Therefore, it can be advantageous to provide the master node aggregator schedule to the first device 630 and the second device 640 (or any other additional device in the local network of devices) in case one of the first or second devices 630, 640 later assumes the role of the master aggregator node in the wireless network 600.

Figure 7:
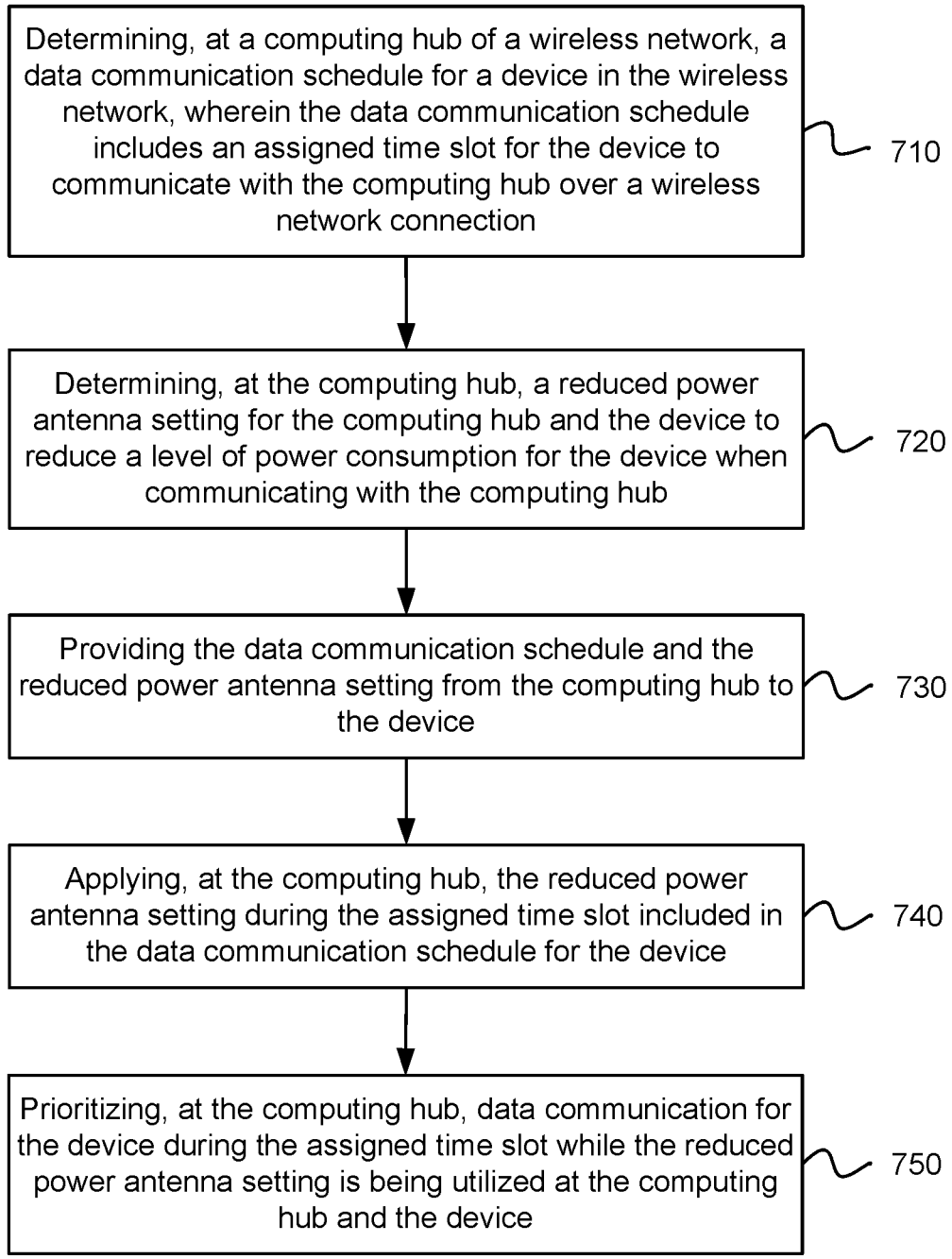
FIG. 7 is a flowchart of an example method for configuring data communication schedules for devices.

FIG. 7 illustrates an example of a method for configuring data communication schedules for devices (e.g., IoT devices). A computing hub in a wireless network may determine a data communication schedule for a device in the wireless network, as in block 710. The data communication schedule may include an assigned time slot for the device to communicate with the computing hub over a wireless network connection. The device may communicate with various services in a service provider environment via the computing hub.

The computing hub may determine a modified antenna setting for the computing hub and the device to reduce a level of power consumption when the device and the computing hub are communicating, as in block 720. For example, the computing hub may receive a data frequency indicator representing a frequency of data communications with the device. The computing hub may receive an average size of data communications with the device. Accordingly, the computing hub may determine the data communication schedule for the device based on the frequency of data communications and the average size of data communications.

In another example, the computing hub may use a machine learning model to determine the modified antenna setting to be used by the computing hub and the device based on previously used modified antenna settings, and the computing hub may use a machine learning model to determine the data communication schedule for the device based on a historical data communication pattern of the device.

The data communication schedule and the modified antenna setting may be provided from the computing hub to the device, as in block 730. In addition, the computing hub may instruct the device to be in a reduced power mode as a default mode and to wake up from the reduced power mode and enter into an active mode during the assigned time slot included in the data communication schedule to perform data communication with the computing hub.

The computing hub may invoke or use the modified antenna setting during the assigned time slot included in the data communication schedule for the device, as in block 740. In addition, the device may also use the modified antenna setting during the assigned time slot included in the data communication schedule. In other words, both the computing hub and the device may use the same modified antenna setting at a same time in accordance with the data communication schedule for the device.

The computing hub may prioritize data communication for the device during the assigned time slot and when the modified antenna setting is being utilized at the computing hub and the device, as in block 750. In addition, the data communication may occur after the device has entered into the active mode during the assigned time slot included in the data communication schedule. The device may revert back to the reduced power mode after performing the data communication with the computing hub.

Figure 8:
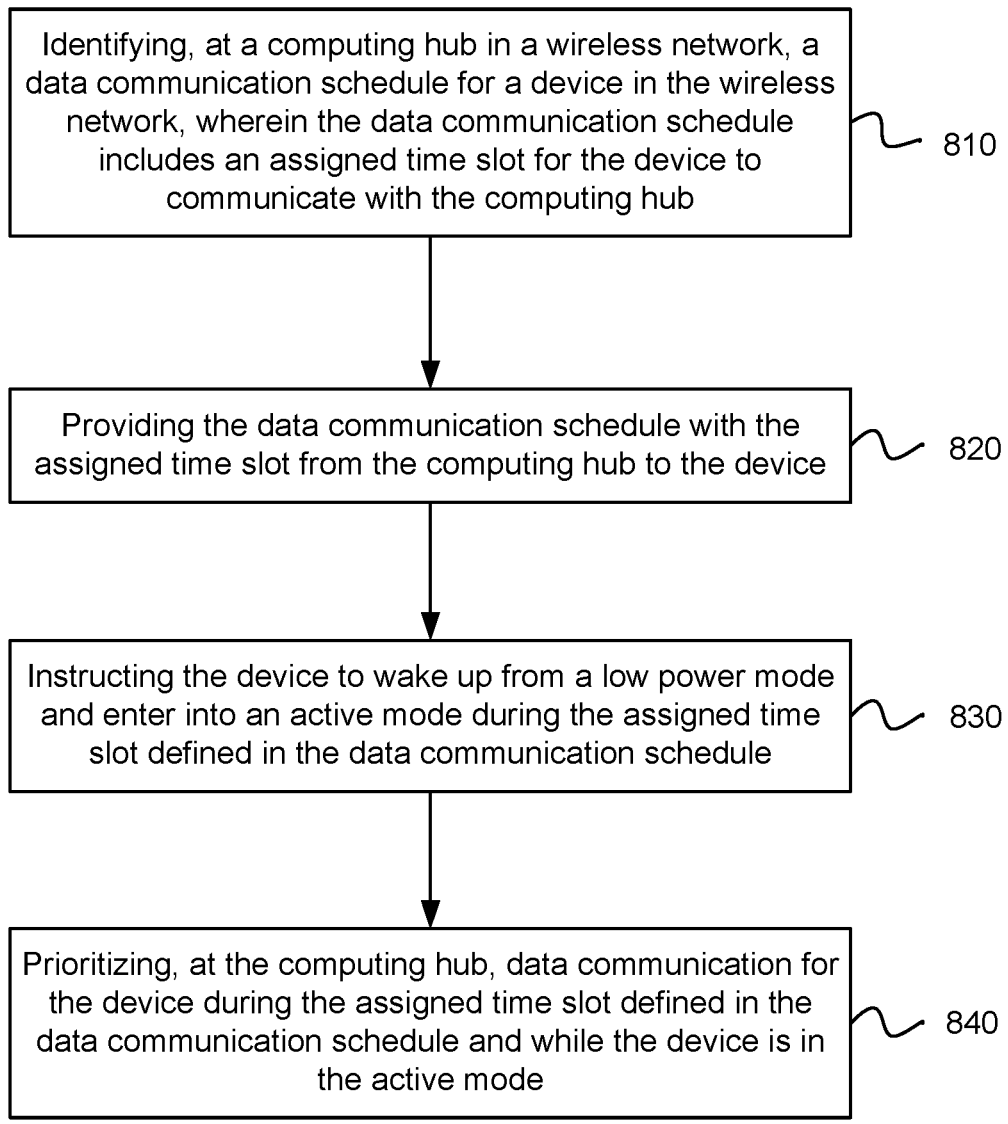
FIG. 8 is a flowchart of another example method for configuring data communication schedules for devices.

FIG. 8 illustrates an example of a method for configuring data communication schedules for devices (e.g., IoT devices). A computing hub in a wireless network may identify a data communication schedule for a device in the wireless network, as in block 810. The data communication schedule may include an assigned time slot for the device to communicate with the computing hub. In one example, the computing hub may monitor data communications from the device for a defined period of time, and the computing hub may determine using a machine learning model the data communication schedule for the device based on a frequency of data communications from the device during the defined period of time.

The data communication schedule with the assigned time slot may be provided from the computing hub to the device, as in block 820. The assigned time slot may be for one device, or the assigned time slot may be utilized for other devices in the wireless network. In one example, the computing hub may provide data communication schedules for a plurality of devices in the wireless network, and the data communication schedules may include a reduced level of overlapping or shared time slots for the devices to reduce a congestion level between the devices when performing data communications with the computing hub.

The device may be instructed by the computing hub to wake up from a reduced power mode and enter into an active mode during the assigned time slot defined in the data communication schedule, as in block 830. The device may be in the reduced power mode as a default when the device is not communicating with the computing hub, which may result in increased power savings at the device. The device may be unable to communicate while in reduced power mode, and may transition into the active mode in order to communicate with the computing hub.

The computing hub may prioritize data communication for the device during the assigned time slot defined in the data communication schedule and when the device is in the active mode, as in block 840. After the device performs the data communication with the computing hub during the assigned time slot, the device may revert back to the reduced power mode until an upcoming data communication is to be performed.

Figure 9:
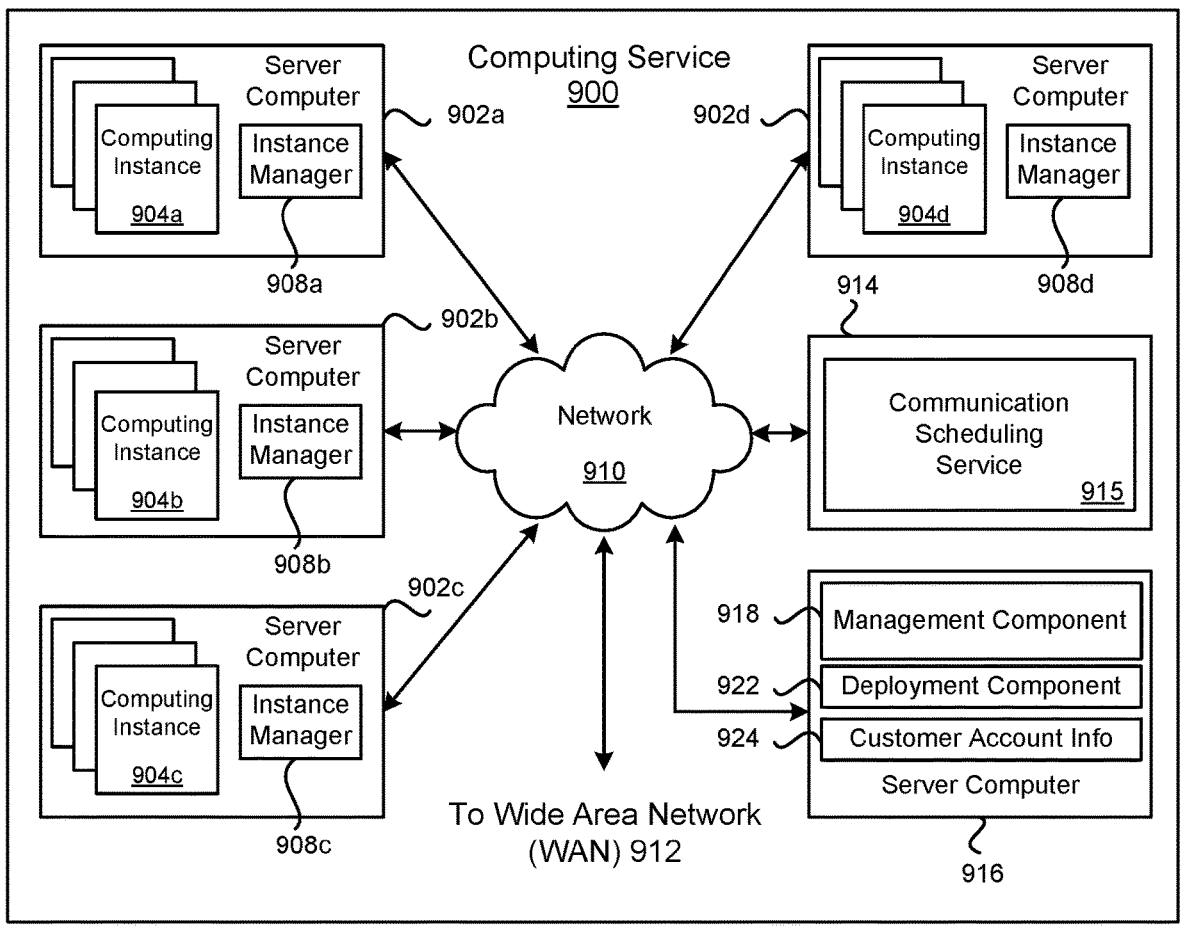
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904*a-d*. Computing instances 904*a-d* may, for example, be virtual machines. A virtual machine may be an instance of a software implementation of a machine (i.e. a computer) that executes applications like a physical machine. In the example of a virtual machine, each of the server computers 902*a-d* may be configured to execute an instance manager 908*a-d* capable of executing the instances. The instance manager 908*a-d* may be a hypervisor, virtual machine manager (VIVEVI), or another type of program configured to enable the execution of multiple computing instances 904*a-d* on a single server. Additionally, each of the computing instances 904*a-d* may be configured to execute one or more applications.

A server 914 may be reserved to execute software components for implementing the present technology or managing the operation of the computing service 900 and the computing instances 904*a-d*. For example, the server computer 914 may execute a communication scheduling service 915 operable to receive a data frequency indicator representing a frequency of data communications between a computing hub and a device. The communication scheduling service 915 may also receive an average size of data communications between the computing hub and the device. As a result, the communication scheduling service 915 may determine a data communication schedule for the device based on the frequency of data communications and the average size of data communications. The communication scheduling service 915 may provide the data communication schedule to a computing hub (see FIG. 2), and the computing hub may forward the data communication schedule to the device.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904*a-d*, provide scripts and/or other types of code to be executed for configuring computing instances 904*a-d*, provide cache logic specifying how an application cache is to be prepared, and other types of information. The deployment component 922 may utilize the customer-provided configuration and cache logic to configure, prime, and launch computing instances 904*a-d*. The configuration, cache logic, and other information may be specified by a customer accessing the management component 918 or by providing this information directly to the deployment component 922.

Customer account information 924 may include any desired information associated with a customer of the multitenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902*a-d*. The network topology illustrated in FIG. 9 has been simplified, as many more networks and networking devices may be utilized to interconnect the various computing systems disclosed herein.

Figure 10:
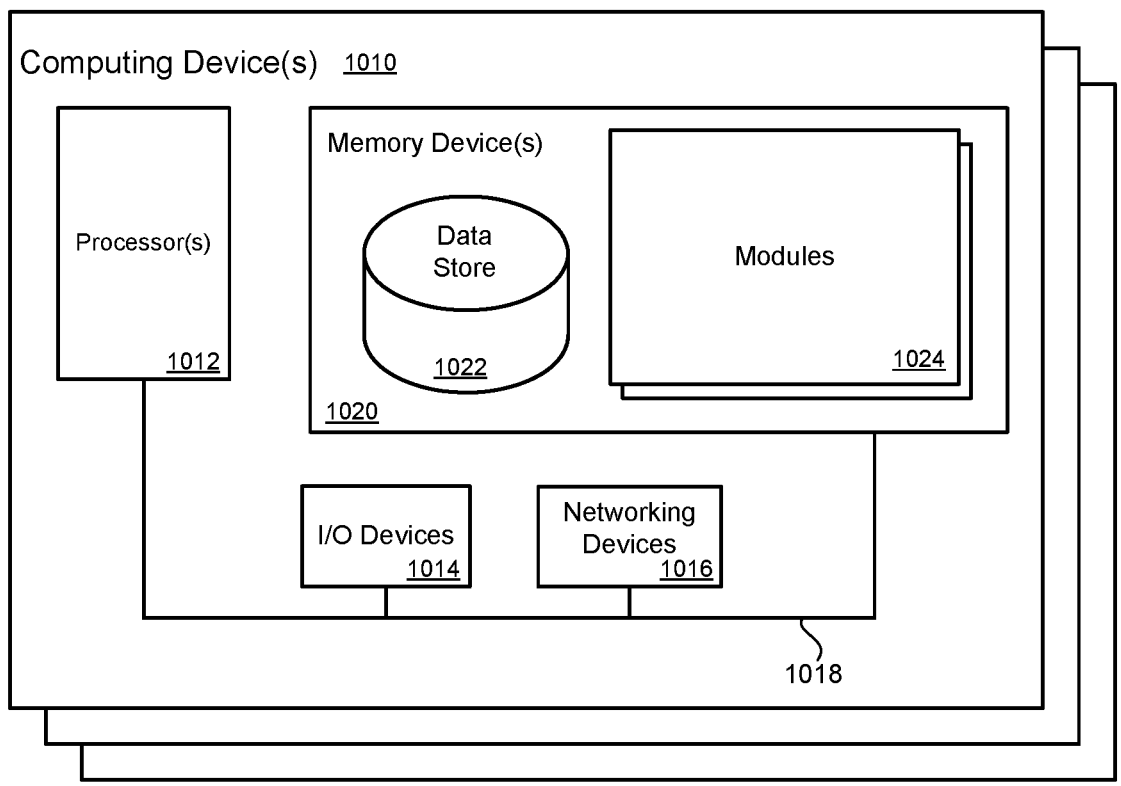
FIG. 10 is a block diagram that provides an example illustration of a computing device that may be employed in the present technology.

FIG. 10 illustrates a computing device 1010 on which modules or code components of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 or code components that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by one or more processors, comprising:
   determining, at a computing hub of a wireless network, a data communication schedule for a device in the wireless network, wherein the data communication schedule includes an assigned time slot for the device to communicate with the computing hub over a wireless network connection;
   determining, at the computing hub, a modified antenna setting for the computing hub and the device, wherein the modified antenna setting causes a reduction of power consumption for the device when communicating with the computing hub;

providing the data communication schedule and the modified antenna setting from the computing hub to the device;
instructing the device to apply the modified antenna setting;
applying, at the computing hub, the modified antenna setting during the assigned time slot included in the data communication schedule for the device; and
prioritizing, at the computing hub, data communication for the device during the assigned time slot while the modified antenna setting is being utilized at the computing hub and the device.

2. The non-transitory machine readable storage medium of claim 1, further comprising instructing the device to be in a reduced power mode as a default mode and to wake up from the reduced power mode and enter into an active mode during the assigned time slot included in the data communication schedule to enable the data communication with the computing hub.

3. The non-transitory machine readable storage medium of claim 1, further comprising:
receiving a data frequency indicator representing a frequency of data communications with the device;
receiving an average size indicator representing an average data transfer size of data communications with the device; and
determining, at the computing hub, the data communication schedule for the device using the frequency of data communications and the average data transfer size of data communications.

4. The non-transitory machine readable storage medium of claim 1, further comprising using a machine learning model to determine at least one of: the modified antenna setting to be used by the computing hub and the device based on previously used antenna settings that reduce power consumption, or the data communication schedule for the device based on a historical data communication pattern of the device.

5. The non-transitory machine readable storage medium of claim 1, wherein the modified antenna setting for the computing hub and the device includes a modification to: an amount of antenna gain, an antenna radiation pattern, an antenna beam width, an antenna polarization, an antenna impedance level, or a combination thereof.

6. A method, comprising:
identifying, at a computing hub in a wireless network, a data communication schedule for a device in the wireless network, wherein the data communication schedule includes an assigned time slot for the device to communicate with the computing hub;
determining a modified antenna setting for the computing hub and the device, wherein the modified antenna setting causes a reduction of power consumption for the device when communicating with the computing hub;
providing the data communication schedule with the assigned time slot and the modified antenna setting from the computing hub to the device;
instructing the device to wake up from a reduced power mode and enter into an active mode during the assigned time slot defined in the data communication schedule;
instructing the device to apply the modified antenna setting; and
prioritizing, at the computing hub, data communication for the device during the assigned time slot defined in the data communication schedule and while the device is in the active mode and the modified antenna setting is configured to be used at the computing hub and the device.

7. The method of claim 6, further comprising:
monitoring data communications with the device for a defined period of time; and determining, using a machine learning model, the data communication schedule for the device based on a frequency of data communications with the device during the defined period of time.

8. The method of claim 6, further comprising scheduling computing resources in the computing hub to be used by multiple devices, thereby reducing a likelihood of overloading computing resources of the computing hub when multiple requests for computing resources to the computing hub are received.

9. The method of claim 6, further comprising:
determining a modified antenna setting for the computing hub and the device to reduce a level of power consumption for the device when communicating with the computing hub;
providing the modified antenna setting from the computing hub to the device; applying the modified antenna setting at the computing hub during the assigned time slot defined in the data communication schedule for the device; and
prioritizing the data communication for the device during the assigned time slot when the modified antenna setting is being utilized at the computing hub and the device.

10. The method of claim 6, further comprising:
sending one or more training messages to the device, wherein a training message is communicated with a separate antenna setting being utilized by the computing hub and the device; and
selecting a modified antenna setting from separate antenna settings being utilized at the computing hub and the device, wherein the modified antenna setting is associated with a training message that is successfully received at the device consuming a reduced amount of power as compared to other training messages.

11. The method of claim 6, further comprising:
detecting a signal power level associated with data received from the device during the assigned time slot;
determining that the signal power level is below a defined threshold; and
adjusting a modified antenna setting for the computing hub and the device that improves the signal power level for the device to above the defined threshold when communicating with the computing hub, wherein the modified antenna setting is adjusted by resending one or more training signals from the computing hub to the device.

12. The method of claim 6, further comprising:
receiving data from the device during the assigned time slot;
determining that the data is unreadable; and
adjusting a modified antenna setting for the computing hub and the device that causes the device to send data that is readable to the computing hub, wherein the modified antenna setting is adjusted using one or more training signals re-sent from the computing hub to the device.

13. The method of claim 6, further comprising assigning a group antenna setting to a group of devices in the wireless network, wherein the group of devices are configured to communicate with the computing hub using the group antenna setting during a time slot defined in a group data communication schedule for the group of devices.

14. The method of claim 6, further comprising determining data communication schedules for a plurality of devices in the wireless network, wherein the data communication schedules include a reduced level of overlapping time slots for the devices to reduce a congestion level between the devices when enabling data communications with the computing hub.

15. The method of claim 6, further comprising:
receiving data from the device during the assigned time slot, wherein the data is addressed to a second device in the wireless network;
storing the data in a queue maintained at the computing hub; and
sending the data from the queue in the computing hub to the second device during an assigned time slot for the second device in accordance with a second data communication schedule for the second device.

16. The method of claim 6, further comprising allocating an open time slot for the device in the wireless network, wherein the computing hub is permitted to enable the data communication with the device during the open time slot when the device is unable to perform the data communication with the computing hub during the assigned time slot included in the data communication schedule.

17. A computing hub of a wireless network, comprising:
at least one processor;
at least one memory device including a data store to store a plurality of data and instructions that, when executed, cause the computing hub to:
determine a data communication schedule for a device in the wireless network, wherein the data communication schedule includes an assigned time slot for the device to communicate with the computing hub;
determine a modified antenna setting comprising information, wherein the modified antenna setting causes a reduction of power consumption when communicating with the computing hub;
provide the data communication schedule and the modified antenna setting to the device, wherein the modified antenna setting is for the computing hub and the device;
instruct the device to apply the modified antenna setting;
apply the modified antenna setting during the assigned time slot included in the data communication schedule for the device; and
prioritize data communication for the device during the assigned time slot while the modified antenna setting is being utilized at the computing hub and the device.

18. The computing hub of claim 17, wherein the plurality of data and instructions, when executed, cause the computing hub to: instruct the device to be in a reduced power mode as a default mode and to wake up from the reduced power mode and enter into an active mode during the assigned time slot included in the data communication schedule to enable the data communication with the computing hub.

19. The computing hub of claim 17, wherein the plurality of data and instructions, when executed, cause the computing hub to:
receive a data frequency indicator representing a frequency of data communications with the device;
receive an average size indicator representing an average data transfer size of data communications with the device; and
determine the data communication schedule for the device using the frequency of data communications and the average data transfer size of data communications.

20. The computing hub of claim 17, wherein the plurality of data and instructions, when executed, cause the computing hub to:
use a machine learning model to determine the modified antenna setting to be used by the computing hub and the device based on previously used antenna settings that reduce power consumption; and
use the machine learning model to determine the data communication schedule for the device based on a historical data communication pattern of the device.

* * * * *